United States Patent [19]
Atkinson

[11] Patent Number: 6,084,644
[45] Date of Patent: Jul. 4, 2000

[54] TELEVISION REMOTE CONTROL WITH CHANNEL-DEFINED KEYS

[76] Inventor: John B. Atkinson, 604 W. Palmyra Ave., Orange, Calif. 92868

[21] Appl. No.: 09/002,332

[22] Filed: Jan. 5, 1998

[51] Int. Cl.⁷ .................................................. H04N 5/00
[52] U.S. Cl. ............................................ 348/734; 345/172
[58] Field of Search ........................ 348/734; 358/194.1; 345/169, 172; 341/23; 359/146, 148; 455/151.1, 151.2, 151.4, 158.1; 40/661; 400/493, 495, 490; H04N 5/00

[56] References Cited

U.S. PATENT DOCUMENTS

| | | | |
|---|---|---|---|
| 4,512,092 | 4/1985 | McLaughlin | 341/23 |
| 5,031,046 | 7/1991 | Bruggemann | 348/734 |
| 5,315,392 | 5/1994 | Ishikawa et al. | 348/734 |
| 5,883,680 | 3/1999 | Nykerk | 348/734 |

FOREIGN PATENT DOCUMENTS

| | | | |
|---|---|---|---|
| 0360070 | 3/1990 | European Pat. Off. | H04N 5/45 |
| 6-54267 | 2/1994 | Japan | H04N 5/44 |

*Primary Examiner*—David E. Harvey

[57] ABSTRACT

A television remote control with channel-defined keys is provided including a housing. Also included is a plurality of control keys mounted on the housing having a pair of volume keys for remotely controlling a volume associated with the emission of audio signals by a television and a pair of channel toggle keys for remotely changing channels of the television in an incrementing and decrementing manner. Further provided is a plurality of user keys configured in a matrix on the housing. Each user key effects the transmission of a signal to change the channel of the television to a predetermined channel associated with the user key. Each user key has indicia associated therewith which corresponds with the corresponding channel.

5 Claims, 3 Drawing Sheets

TELEVISION REMOTE CONTROL WITH CHANNEL-DEFINED KEYS

BACKGROUND OF THE INVENTION

1. Field of the Invention

The present invention relates to a television remote control with channel-defined keys and more particularly pertains to allowing a user to identify and switch more quickly to his or her favorite channels.

2. Description of the Prior Art

The use of remote controls is known in the prior art. More specifically, remote controls heretofore devised and utilized for the purpose of controlling a television are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,031,046; U.S. Pat. No. 5,410,326; U.S. Pat. No. Des. 322,610; U.S. Pat. No. 4,728,949; U.S. Pat. No. 4,338,632; and U.S. Pat. No. 4,145,720.

When these remote controls were first patented, produced and marketed; there were only broadcast network channels available to the consumer. TV stations promoted their channel number rather than channel name as television stations were broadcast on that same channel number.

As the number of channels has expanded in recent years with cable and satellite television services, stations are now known by name and not channel number. Channel numbers are decided by cable services, satellite services, and other individual television services and differ on every television. The number of available television channels continues growing, and the memorization of channel numbers individually assigned to these stations becomes more difficult to consumers.

In this respect, the television remote control with channel-defined keys according to the present invention substantially departs from the conventional concepts and designs of the prior art, and in so doing provides an apparatus primarily developed for the purpose of allowing a user to identify and select more quickly his or her favorite channels.

Therefore, it can be appreciated that there exists a continuing need for a new and improved television remote control with channel-defined keys which can be used for allowing a user to identify quickly his or her favorite channels. In this regard, the present invention substantially fulfills this need.

SUMMARY OF THE INVENTION

In view of the foregoing disadvantages inherent in the known types of remote controls now present in the prior art, the present invention provides an improved television remote control with channel-defined keys. As such, the general purpose of the present invention, which will be described subsequently in greater detail, is to provide a new and improved television remote control with channel-defined keys which has all the advantages of the prior art and none of the disadvantages.

To attain this, the present invention essentially comprises a housing having a front extent with a rectangular planar configuration. The front extent is defined by a top face, a bottom face, and a periphery formed therebetween. As best shown in FIG. 2, the top face of the front extent has a rectangular recess portion formed therein. The housing further has a rear extent with a planar rectangular configuration including a top face, a bottom face and a periphery formed therebetween. The rear extent has a front edge integrally coupled to a rear edge of the front extent. As shown in FIG. 2, the rear extent resides in a plane offset by about 20 degrees with respect to a plane in which the front extent is contained. Also included is a plurality of control keys mounted on the top face of the rear extent. Such control keys include a pair of volume keys for remotely controlling a volume associated with the emission of audio signals by a television and a pair of channel toggle keys for remotely changing channels of the television in an incrementing and decrementing manner. These buttons are located in the center section of the remote, along with a mute button on the left side, and a previous channel button on the right side next to the channel control buttons. Further provided is a plurality of numeric keys for remotely selecting a specific channel of the television by entering a channel number associated therewith. On the right side of the "0" is an Enter button which is needed for some television sources and could also be used as a display button. On the left side of the "0" is a TV/VCR button to change the source of video going to the TV. This could also be used as a picture in picture button.

Below the channel number buttons lie six video player source control buttons. The top three are for recording, playing, and pausing the video source, and below that ate three more buttons for rewinding, stopping and fast forwarding the video source.

Lastly, a plurality of mode keys are adapted for determining a source of television signals. For allowing a user to easily switch to any one of his or her preferred channels, a plurality of blanket are configured in a matrix on the top face of the front extent within the recess formed therein. Each channel-defined key is adapted to be programmed such that upon the depression thereof, a signal is transmitted to effect the changing of the channel of the television to one selectively predetermined channel associated with the-channel-defined key.

The face of each channel defined key is a frosted white made of semi-clear plastic with light underneath. When channel defined key is pressed, lights under each channel defined key turn on for five seconds exposing color logos on each channel defined key. When station key is selected, television changes to the selected channel, and the selected channel defined key on remote control remains lit. If channel toggle key is used, all channel defined keys will light for five seconds, then turn off.

Remotes could be manufactured and sold pre-labelled with the logos of selected channels. Channel buttons and channel button locations could then be determined by the manufacturer, or by the cable company, or by the satellite service, or by any television service offering the remote control, or by the vender selling the remote control, or the channel defined keys to be selected and the location of those channel defined keys could be made by the individual user of the remote control.

Programming of each channel defined key is done by pressing the channel key to be programmed, then entering the channel number attached to that channel, then releasing the channel defined key. To enter more than one channel to an individual button; the defined key to be programmed is pressed, the first channel number is entered, then the enter button is pressed, then a second channel number is entered then the enter button is pressed again, and so on.

So that the user may select the programmed channel button and location of the button on the remote control, a plurality of labels could be included (FIG. 3) each having a generally circular face with a linear edge. Labels are applied in downwardly motion (as shown in FIG. 4). An adhesive lines the bottom surface on each label and associated therewith is a waxed paper making labels easy to remove from the base sheet and easy to attach to the remote buttons. Each label is protected by small edge on each channel defined button on the remote control.

So that the user may select the location of the programmed channel of each channel-defined key, a plurality of caps could instead be included each having a generally circular top face with a chord being cut out to define a linear edge. A periphery defined by a portion of a cylinder is integrally coupled to the top face. Such periphery depends downwardly from the top face and further terminates at ends of the linear edge thereby affording an opening. For reasons that will become apparent hereinafter, a peripheral flange is integrally coupled to a bottom edge of the periphery and extends radially therefrom. An adhesive lines a bottom surface of the top face. Associated therewith is a waxed paper backing including a circular portion removably mounted on the bottom surface of the top face. The backing further includes a generally rectangular pull tab integrally extending from the circular portion. This tab protrudes from the opening of the periphery prior to use of the cap for being gripped by a user. Lastly, indicia indicative of a television channel is printed on an upper surface of the top face of each cap. During use, the backing may be removed and the cap situated on one of the keys. The placement is such that the indicia of the cap corresponds with the selectively determined channel associated therewith. Finally, a lid is included having a planar rectangular configuration with a matrix of circular apertures formed therein. The lid has an inboard edge hingably coupled to a rear edge of the front extent of the housing. As such, the lid has a raised orientation during use for allowing the placement of the caps on the key. Further, the lid has a lower orientation for abutting the peripheral flange of each of the caps for precluding the removal thereof during use.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved television remote control with channel-defined keys which has all the advantages of the prior art remote controls and none of the disadvantages.

It is another object of the present invention to provide a new and improved television remote control with channel-defined keys which may be easily and efficiently manufactured and marketed.

It is a further object of the present invention to provide a new and improved television remote control with channel-defined keys which is of a durable and reliable construction.

An even further object of the present invention is to provide a new and improved television remote control with channel-defined keys which is susceptible of a low cost of manufacture with regard to both materials and labor, and which accordingly is then susceptible of low prices of sale to the consuming public, thereby making such television remote control with channel-defined keys economically available to the buying public.

Still yet another object of the present invention is to provide a new and improved television remote control with channel-defined keys which provides in the apparatuses and methods of the prior art some of the advantages thereof, while simultaneously overcoming some of the disadvantages normally associated therewith.

Still another object of the present invention is to allow a user to identify quickly his or her favorite channels.

Lastly, it is an object of the present invention to provide a new and improved television remote control with channel-defined keys including a housing. Also included is a plurality of control keys mounted on the housing having a pair of volume keys for remotely controlling a volume associated with the emission of audio signals by a television and a pair of channel toggle keys for remotely changing channels of the television in an incrementing and decrementing manner. These channel and volume keys may appear similar to the letter "X" from a distance as each of the four button is shaped like a triangle. The two buttons on the right are for changing channels up and down, and the two buttons on the left are for adjusting the volume. This gives each button a certain feel allowing an easy adjustment of channel and volume without looking at the remote control. The channel adjustment key would work similar to a computer keyboard in that when the channel up or down button is pressed longer than one second, channels would search faster. Further provided is a plurality of user keys configured in a matrix on the housing. Each user key effects the transmission of a signal to change the channel of the television to a predetermined channel associated with the user key. Each user key has indicia associated therewith which corresponds with the corresponding channel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figures 1, 2:
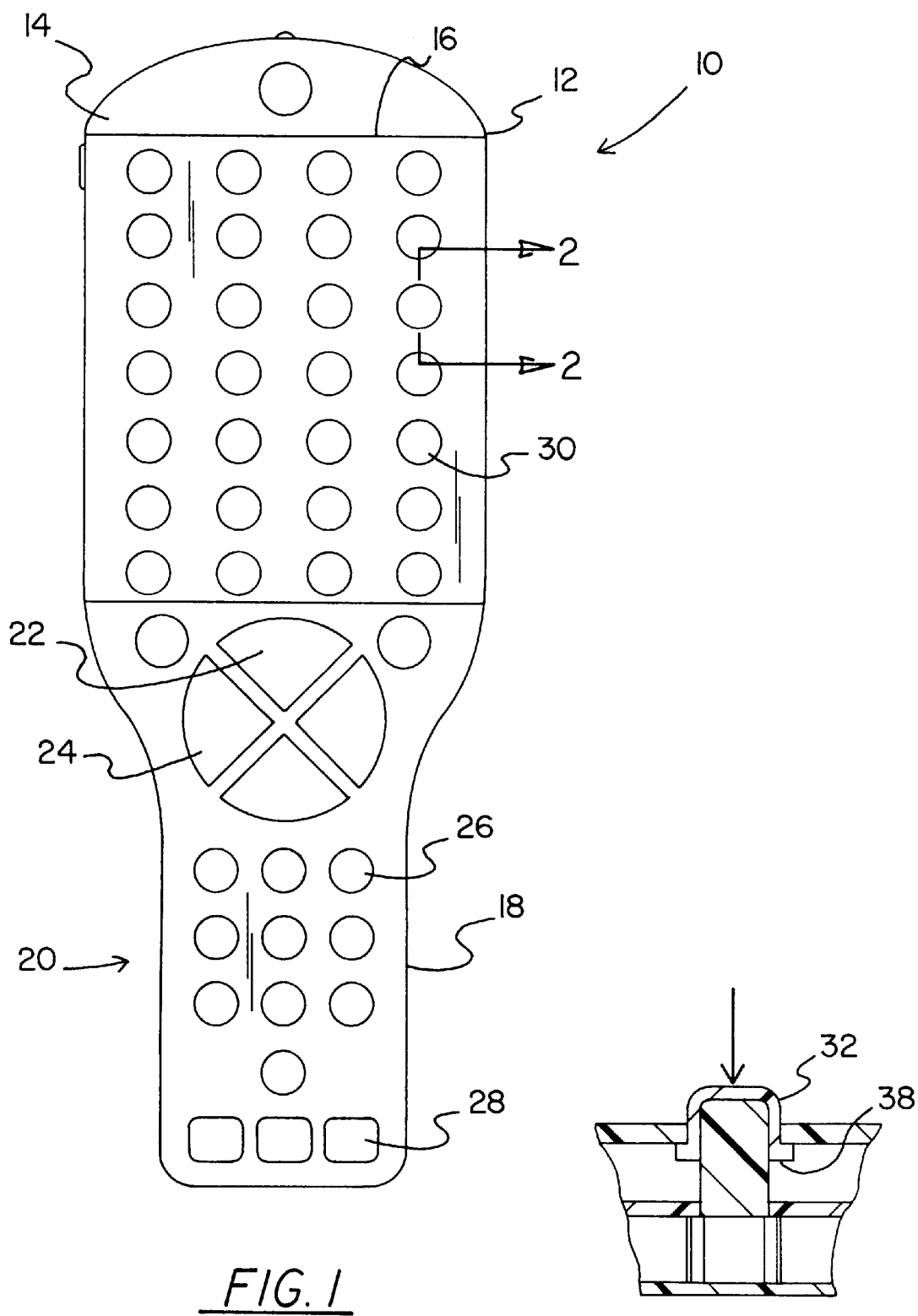
FIG. 1 is a perspective illustration of the preferred embodiment of the television remote control with channel-defined keys constructed in accordance with the principles of the present invention.
FIG. 2 is a side view of the present invention.

With reference now to the drawings, and in particular to FIG. 1 thereof, a new and improved television remote control with channel-defined keys embodying the principles and concepts of the present invention and generally designated by the reference numeral 10 will be described.

The present invention, the new and improved television remote control with channel-defined keys, is comprised of a plurality of components. Such components in their broadest context include a housing, control keys, channel-defined keys, and a plurality of labels or caps. Such components are individually configured and correlated with respect to each other so as to attain the desired objective.

More specifically, it will be noted that the system 10 of the present invention includes a housing 12 having a front extent 14 with a rectangular planar configuration. The front extent is defined by a top face, a bottom face, and a periphery formed therebetween. As best shown in FIG. 2, the top face of the front extent has a rectangular recess portion 16 formed therein.

The housing further has a rear extent 18 with a planar rectangular configuration including a top face, a bottom face and a periphery formed therebetween. The rear extent has a front edge integrally coupled to a rear edge of the front extent. As shown in FIG. 2, the rear extent resides in a plane offset by about 20 degrees with respect to a plane in which the front extent is contained. As shown in FIG. 1, the rear extent has less width than that of the front extent to facilitate handling.

Also included is a plurality of control keys 20 mounted on the top face of the rear extent. Such control keys include a pair of volume keys 22 for remotely controlling a volume associated with the emission of audio signals by a television and a pair of channel toggle keys 24 for remotely changing channels of the television in an incrementing and decrementing manner.

In the preferred embodiment, the volume and channel keys together form an "X" configuration and further each define a quarter of the "X" shaped in four triangles. The two triangular buttons on the right side of the "X" 24 are for changing channels up and down, and the two buttons on the left 22 are for adjusting the volume. The button to the right of the channel buttons 44 will change to the previous channel, and the button to the left of the volume buttons 43 will mute the volume. Further provided is a plurality of numeric keys 26 numbering 0–9 for remotely selecting a specific channel of the television by entering a channel number associated therewith.

To the right of the "0" key is an Enter key 46 for entering the channel or displaying the channel currently selected. And to the left of the "0" key is a VCR/TV key 47 for changing the source of video which is running. Below the number keys are video source control keys 48. Buttons for record, play, and pause are on the first row, and the rewind, stop, and fast forward keys are on the second row.

Lastly, a plurality of mode keys 28 are adapted for determining a source of television signals. For example, such keys may be adapted to select between broadcast television, cable, and a video cassette recorder. And the bottom face 45 holds batteries making it thicker and more comfortable to hold.

For allowing a user to easily switch to any one of his or her preferred channels, a plurality of blanket 30 are configured in a matrix on the top face of the front extent within the recess formed therein. Such matrix preferably consists of five columns and six rows. Remotes could be made with fewer or more columns of channel defined buttons, and remotes could be made with fewer or more rows of channel defined buttons. Channel defined buttons could make up the entire remote control, or could be just a few buttons on the remote control. Each channel-defined key is adapted to be programmed such that upon the depression thereof, a signal is transmitted to effect the changing of the channel of the television to one selectively predetermined channel associated with the channel-defined key. This programming is ideally accomplished by way of choosing the channel button to be defined, pressing and holding down the button, and then entering the numbers assigned to the channel being programmed in that button.

Figure 3:
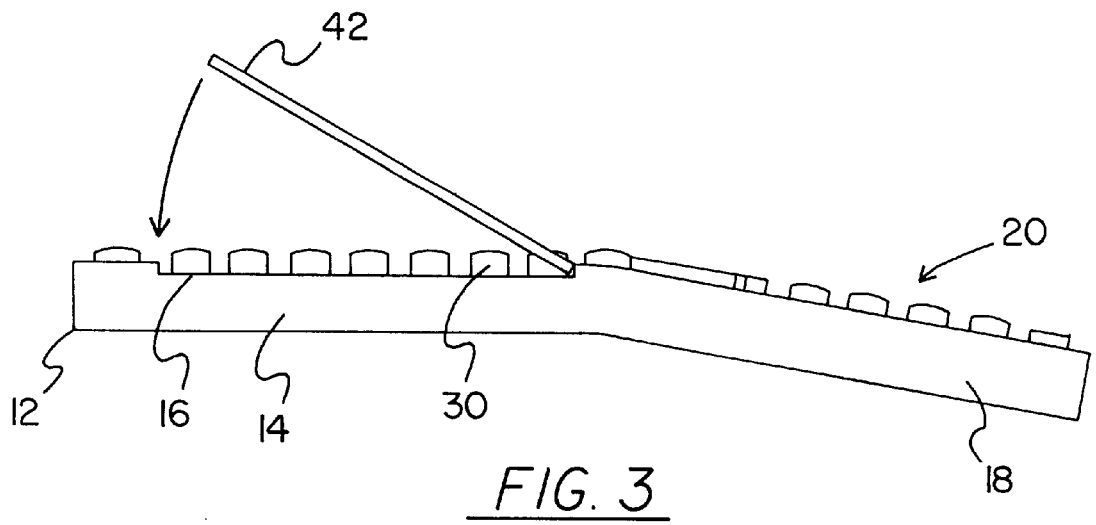
FIG. 3 is an illustration of the label sheet with each label attached to a cone shaped wax paper handle.
Figure 4:
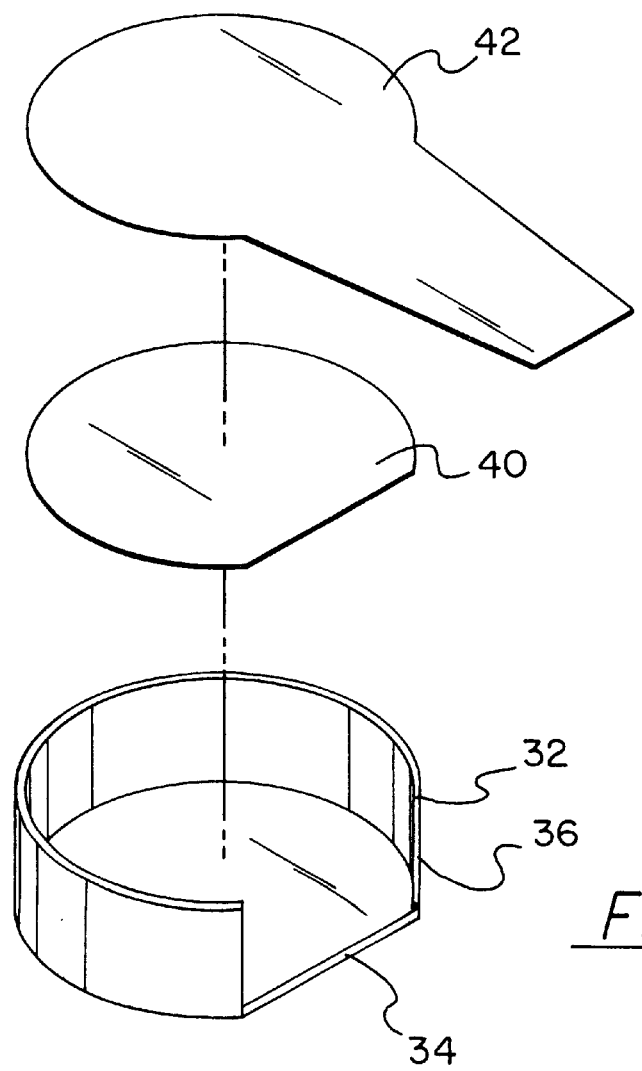
FIG. 4 is a perspective illustration of labels being applied to channel defined buttons.
Figure 5:
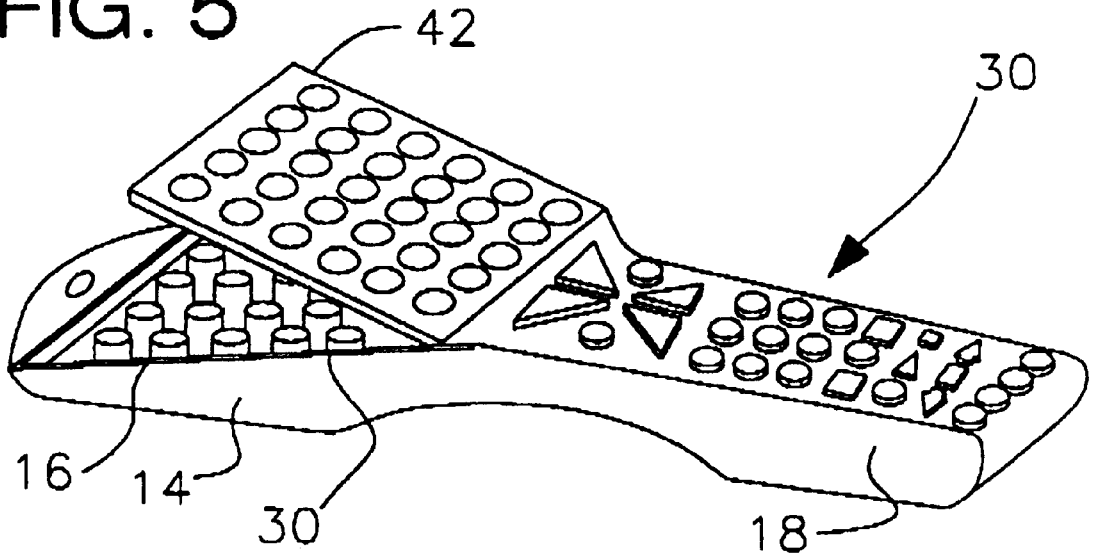
FIG. 5 is a cross sectional view of one of the channel defined keys, cap and lid of the present invention.
Figure 6:
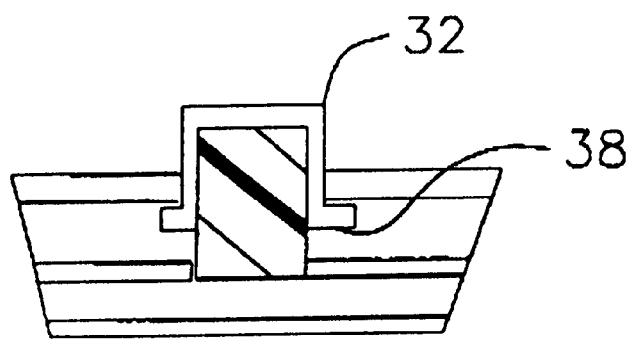
FIG. 6 is a side view of the removable caps.

Another way the user may select the programmed channel button and location of the label on the remote control, a plurality of labels (as shown in FIG. 3) could be included each having a generally circular face with a linear edge. A tab protrudes from each label to be gripped by user and then attached to channel defined key (as shown in FIG. 4). Labels are applied in downwardly motion and are then protected with linear edge on each button. An adhesive lines a bottom surface of each label and associated therewith is a waxed paper handle used in application of label to channel defined button.

So that the user may select the location of the programmed channel of each channel-defined key, a plurality of caps 32 are included each having a generally circular top face with a chord being cut out 34 to define a linear edge. A periphery 36 defined by a portion of a cylinder is integrally coupled to the top face. Such periphery depends downwardly from the top face and further terminates at ends of the linear edge thereby affording an opening. For reasons that will become apparent hereinafter, a peripheral flange 38 is integrally coupled to a bottom edge of the periphery and extends radially therefrom. Indicia indicative of a television channel is printed on an upper surface of the top face of each cap. This indicia is preferably representative of a network associated with the channel.

An adhesive 40 lines a bottom surface of the top face. Associated therewith is a waxed paper 42 backing including a circular portion removably mounted on the bottom surface of the top face. The backing further includes a generally rectangular pull tab integrally extending from the circular portion. This tab protrudes from the opening of the periphery prior to use of the cap for being gripped by a user.

During use, the backing may be removed and the cap situated on one of the keys. The placement is such that the indicia of the cap corresponds with the selectively determined channel associated therewith.

Finally, a lid 42 is included having a planar rectangular configuration with a matrix of circular apertures formed therein. The lid has an inboard edge hingably coupled along a rear edge of the front extent of the housing. As such, the lid has a raised orientation during use for allowing the placement of the caps on the key. Further, the lid has a lower orientation for abutting the peripheral flange of each of the caps for precluding the removal thereof during use. In such lower orientation, the lid is preferably locked in placed by way of a detent and indent combination.

It should be noted that in alternate embodiments, the adhesive and waxed paper are excluded and only the flange is relied upon to work in conjunction with the lid to secure the caps to the channel-defined keys. In yet another alternate embodiment, the flange and lid are excluded and only the adhesive is relied upon to accomplish the same. Still yet another option would be to print the indicia directly onto the key with the present embodiment being sold preprogrammed. As a further option, a control box may be associated with the present invention.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved television remote control with channel-defined keys comprising, in combination:

a housing having a front extent with a rectangular planar configuration including a top face, a bottom face, and a periphery formed therebetween, the top face of the front extent having a rectangular recess portion formed therein, the housing further having a rear extent with a planar rectangular configuration including a top face, a bottom face and a periphery formed therebetween, the rear extent having a front edge integrally coupled to a rear edge of the front extent and residing in a plane offset by about 20 degrees with respect to a plane in which the front extent is contained;

a plurality of control keys mounted on the top face of the rear extent including a pair of volume keys for remotely controlling a volume associated with the emission of audio signals by a television, a pair of channel toggle keys for remotely changing channels of the television in an incrementing and decrementing manner, a plurality of numeric keys for remotely selecting a specific channel of the television by entering a channel number associated therewith, video source controls, and a plurality of mode keys for determining a source of television signals;

a plurality of channel-defined keys configured in a matrix on the top face of the front extent within the recess formed therein, each channel-defined key adapted to be programmed such that upon the depression thereof, a signal is transmitted to effect the changing of the channel of the television to one selectively predetermined channel associated with the channel-defined key;

a plurality of labels each having a generally circular top face with a linear edge with a tab protruding from the label to be gripped by the user when attaching labels, wherein labels are applied in a downwardly motion and are then protected with linear edge on each button, an adhesive lining a bottom surface of each label and associated therewith is a waxed paper handle which can be used when attaching labels, wherein small edge on each button makes label difficult to remove;

a plurality of caps each having a generally circular top face with a chord being cut out to define a linear edge, a periphery defined by a portion of a cylinder integrally coupled to the top face and depending downwardly therefrom and further terminating at ends of the linear edge thereby affording an opening, a peripheral flange integrally coupled to a bottom edge of the periphery and extending radially therefrom, an adhesive lining a bottom surface of the top face, a waxed paper backing including a circular portion removably mounted on the bottom surface of the top face with a generally rectangular pull tab integrally extending therefrom and protruding from the opening of the periphery for being gripped by a user, and indicia indicative of a television channel printed on an upper surface of the top face of each cap, whereby the backing may be removed and the cap situated on one of the keys such that the indicia thereof corresponds with the selectively determined channel associated therewith; and a lid having a planar rectangular configuration with a matrix of circular apertures formed therein, the lid having an inboard edge hingably coupled to a rear edge of the front extent of the housing and having a raised orientation for allowing the placement of the caps on the keys and a lower orientation for abutting the peripheral flange of each of the caps for precluding the removal thereof during use.

2. A television remote control with channel-defined keys comprising:

a housing;

a plurality of keys mounted on the housing including a pair of volume keys for remotely controlling a volume associated with the emission of audio signals by a television, a pair of channel toggle keys for remotely changing channels of the television in an incrementing and decrementing manner, and a plurality of user keys wherein the channel associated with each ones of the user keys are selectively programmed by the manufacturer or the user;

the plurality of user keys which are configured in a matrix on the housing, each user key effecting the transmission of a signal to effect the changing of the channel of the television to one predetermined channel associated with the user key, each user key having indicia associated therewith, wherein the indicia corresponds with the predetermined channel and the indicia being situated on a cap which is in turn removably mounted to the channel-defined key, and wherein each cap includes a flange mounted thereon and further includes a lid having a planar configuration with a matrix of apertures formed therein, the lid having an edge hingably coupled to the housing and having a raised orientation for allowing the placement of the caps on the key and a lower orientation for abutting the peripheral flange of each of the caps for precluding the removal thereof during use.

3. A television remote control with channel-defined keys as set forth in claim 2 wherein each label has adhesive lining a bottom surface thereof for adhering to the user key.

4. A television remote control with channel-defined keys as set forth in claim 3 wherein each label has an opening in a periphery thereof such that a tab associated with a non-stick backing protrudes therefrom and may be gripped by the user.

5. A television remote control with channel-defined keys as set forth in claim 2 the channel and volume keys appear similar to the letter "X" as each of the four buttons is shaped like a triangle, the two buttons on the right adapted for changing channels up and down, and two buttons on the left are for adjusting the volume, wherein to the right of the channel buttons is a previous channel button, and to the left of the volume buttons is a mute button.

* * * * *